United States Patent
Zhao

(10) Patent No.: US 12,225,455 B2
(45) Date of Patent: Feb. 11, 2025

(54) INFORMATION TRANSMISSION METHOD, USER EQUIPMENT AND NETWORK DEVICE

(71) Applicant: DATANG MOBILE COMMUNICATIONS EQUIPMENT CO., LTD., Beijing (CN)

(72) Inventor: Yali Zhao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 412 days.

(21) Appl. No.: 17/788,178

(22) PCT Filed: Dec. 28, 2020

(86) PCT No.: PCT/CN2020/140110
§ 371 (c)(1),
(2) Date: Jun. 22, 2022

(87) PCT Pub. No.: WO2021/136164
PCT Pub. Date: Jul. 8, 2021

(65) Prior Publication Data
US 2023/0026499 A1    Jan. 26, 2023

(30) Foreign Application Priority Data

Jan. 3, 2020  (CN) .......................... 202010006143.9

(51) Int. Cl.
*H04W 48/20* (2009.01)
*H04L 1/08* (2006.01)
*H04W 92/10* (2009.01)

(52) U.S. Cl.
CPC .............. *H04W 48/20* (2013.01); *H04L 1/08* (2013.01); *H04W 92/10* (2013.01)

(58) Field of Classification Search
CPC .......... H04W 48/20; H04W 92/10; H04L 1/08
See application file for complete search history.

(56) References Cited

U.S. PATENT DOCUMENTS 7,890,049 B2 *  2/2011  Chang ................. H04L 1/08
                                                    455/13.1
2005/0272366 A1  12/2005  Eichinger et al.
(Continued)

FOREIGN PATENT DOCUMENTS

CN          1663197 A       8/2005
CN        101141172 A       3/2008
(Continued)

OTHER PUBLICATIONS

R3-181345; Title: "L2-based multi-hop architecture to support IAB architecture requirements"; Source: AT&T; Athens, Greece; Date: Feb. 26-Mar. 2, 2018; pp. 1-8 (Year: 2018).*
(Continued)

*Primary Examiner* — Fahmida S Chowdhury
(74) *Attorney, Agent, or Firm* — Harness, Dickey & Pierce, P.L.C.

(57) ABSTRACT

The present disclosure provides an information transmission method, a UE and a network device, so as to solve the problem that the data transmission reliability is low when the UE accesses a network through a relay. The information transmission method includes transmitting duplicated data to a network device through one of: N relays, where N is a positive integer greater than or equal to 2; or an air interface between the UE and the network device as well as M relays, where M is a positive integer greater than or equal to 1.

20 Claims, 3 Drawing Sheets

(56) References Cited

U.S. PATENT DOCUMENTS

| | | | | |
|---|---|---|---|---|
| 2006/0256768 A1* | 11/2006 | Chan | ...................... | H04L 45/00 709/250 |
| 2007/0275656 A1* | 11/2007 | Chang | ...................... | H04L 1/08 455/9 |
| 2010/0150177 A1* | 6/2010 | Cai | ...................... | H04B 7/022 370/476 |
| 2013/0095747 A1* | 4/2013 | Moshfeghi | ............. | H04B 7/043 455/7 |
| 2013/0290804 A1* | 10/2013 | Haustein | .................... | H04L 1/08 714/748 |
| 2015/0169396 A1* | 6/2015 | Tsyganok | ............ | G06F 11/0721 714/704 |
| 2015/0244761 A1* | 8/2015 | Tsyganok | .................. | H04L 1/08 709/219 |
| 2018/0139682 A1 | 5/2018 | Xu et al. | | |
| 2018/0152353 A1 | 5/2018 | Bergström et al. | | |
| 2018/0279393 A1 | 9/2018 | Liu | | |
| 2019/0132238 A1 | 5/2019 | Tang | | |
| 2021/0037601 A1* | 2/2021 | Xu | ........................ | H04W 88/04 |
| 2021/0377793 A1* | 12/2021 | Moilanen | ............ | H04L 43/0847 |

FOREIGN PATENT DOCUMENTS

| | | |
|---|---|---|
| CN | 101931517 A | 12/2010 |
| CN | 102958129 A | 3/2013 |
| CN | 104539403 A | 4/2015 |
| CN | 106921418 A | 7/2017 |
| CN | 108233993 A | 6/2018 |
| CN | 109391675 A | 2/2019 |
| CN | 110475311 A | 11/2019 |
| WO | WO-2016/183710 A1 | 11/2016 |
| WO | WO-2017/201689 A1 | 11/2017 |
| WO | WO-2019/157948 A1 | 8/2019 |

OTHER PUBLICATIONS

Office Action issued by the Intellectual Property of India Patent Office Dated Oct. 19, 2022 for Application No. 202227036313.

Chinese Office Action dated Jun. 2, 2022 for Application No. 202010006143.9.

Catt, "PDCP duplication for eV2X", Agenda Item 9.10.2, 3GPP TSG-RAN WG2 #101, R2-1802116, Feb. 2-26, 2018, Athens, Greece.

Written Opinion and International Search Report for International Application No. PCT/CN2020/140110 mailed Mar. 16, 2021.

Extended European Search report issued Dec. 20, 2022 in European Application No. 20911166.5.

AT & T, "L2-based multi-hop architecture to support LAB architecture requirements," 3GPP TSG-RAN WG3 #99, R3-181345, Feb. 17, 20218.

Oppo, "Discussion on redundant connectivity support in Lab," 3GPP TSG-RAN2 Meeting AH#1, R2-1800157, Jan. 12, 2018.

* cited by examiner

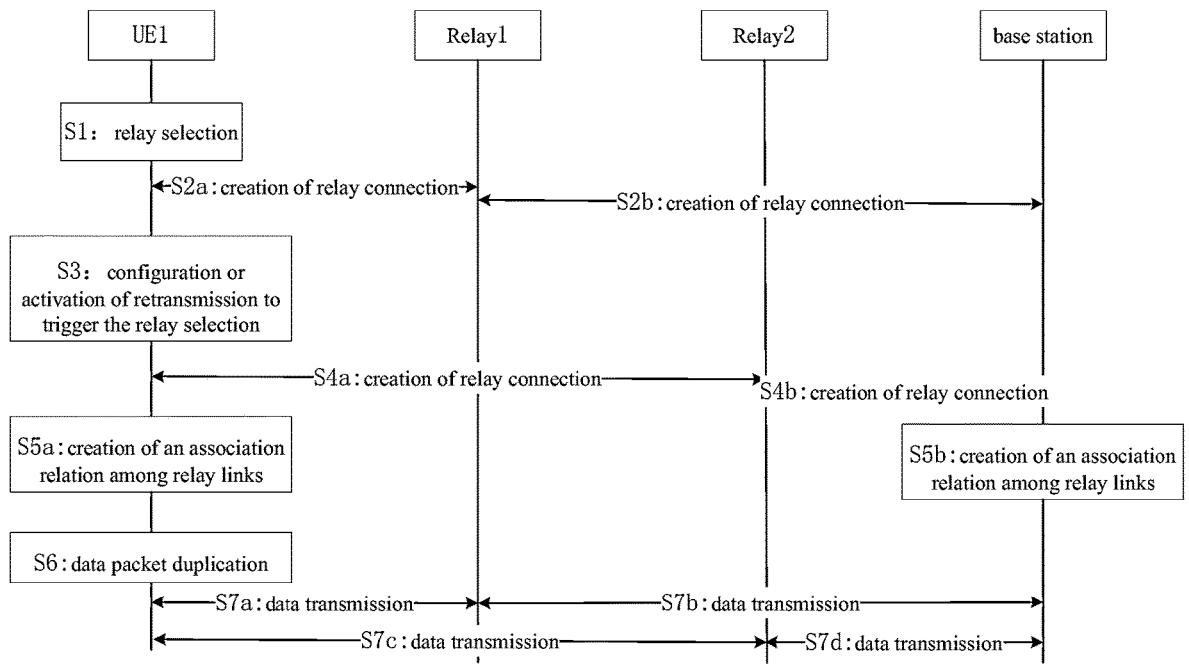

INFORMATION TRANSMISSION METHOD, USER EQUIPMENT AND NETWORK DEVICE

CROSS-REFERENCE TO RELATED APPLICATIONS

This application is the U.S. national phase of PCT Application No. PCT/CN2020/140110 filed on Dec. 28, 2020, which claims a priority of the Chinese patent application No. 202010006143.9 filed on Jan. 3, 2020, which is incorporated herein by reference in its entirety.

TECHNICAL FIELD

The present disclosure relates to the field of communication technology, in particular to an information transmission method, a User Equipment (UE) and a network device.

BACKGROUND

In order to enlarge network coverage, a relay has been introduced, and a UE outside the network coverage may access a network through the relay.

In the related art, a same service for the UE is transmitted merely through one relay, and a single-carrier link is provided between the UE and the relay. Hence, it is impossible for the UE to use a Packet Data Convergence Protocol (PDCP) retransmission mechanism when it accesses the network through the relay, and thereby the data transmission reliability is low.

SUMMARY

An object of the present disclosure is to provide an information transmission method, a UE and a network device, so as to solve the problem in the related art where the data transmission reliability is low when the UE accesses a network through a relay.

In one aspect, the present disclosure provides in some embodiments an information transmission method for a UE, including transmitting duplicated data to a network device through one of: N relays, where N is a positive integer greater than or equal to 2; or an air interface between the UE and the network device as well as M relays, where M is a positive integer greater than or equal to 1.

In some possible embodiments of the present disclosure, the N relays are of a same relay type and belong to a same serving cell or a same serving network node.

In some possible embodiments of the present disclosure, prior to transmitting the duplicated data to the network device, the information transmission method further includes: in the case that a target bearer needs to be configured or retransmission has been activated, selecting T relays, where T is equal to N or M; creating respectively relay connection between the UE and the network device through the T relays; creating a first association relation among T relay links formed by the T relays, or creating a second association relation between the air interface between the UE and the network device and each of the T relay links formed by the T relays, the first association relation being used to indicate the target bearer to transmit same data through the T relay links, the second association relation being used to indicate the target bearer to transmit same data through the air interface and the T relay links; and performing duplication processing on a to-be-transmitted data packet for the target bearer to obtain the duplicated data.

In some possible embodiments of the present disclosure, the selecting the T relays includes: selecting the T relays simultaneously in one relay selection procedure; or selecting the T relays in multiple relay selection procedures.

In some possible embodiments of the present disclosure, the selecting the T relays simultaneously in one relay selection procedure includes: selecting the T relays from relays whose Reference Signal Received Power (RSRP) value is above a first RSRP threshold configured by the network device in a descending order of the RSRP values; or selecting the T relays in the descending order of the RSRP values of the relays.

In some possible embodiments of the present disclosure, the creating the first association relation among the T relay links formed by the T relays or creating the second association relation between the air interface between the UE and the network device and each of the T relay links formed by the T relays includes: creating the first association relation among the T relay links formed by the T relays or creating the second association relation between the air interface between the UE and the network device and each of the T relay links formed by the T relays through control plane signaling; or creating the first association relation among the T relay links formed by the T relays or creating the second association relation between the air interface between the UE and the network device and each of the T relay links formed by the T relays through user plane signaling.

In some possible embodiments of the present disclosure, the creating the first association relation among the T relay links formed by the T relays or creating the second association relation between the air interface between the UE and the network device and each of the T relay links formed by the T relays through control plane signaling includes, with respect to each relay link, recording at least one of an air interface (Uu) Radio Bearer (RB) Identity (ID), a Uu Logic Channel Identity (LCID), a relay UE ID, a UE ID, a source L2 ID, a destination L2 ID, an LCID, or a Sidelink Radio Bearer (SLRB) ID.

In some possible embodiments of the present disclosure, links with a same Uu RB ID and a same UE ID are used by the UE as a downlink retransmission path.

In some possible embodiments of the present disclosure, the creating the first association relation among the T relay links formed by the T relays or creating the second association relation between the air interface between the UE and the network device and each of the T relay links formed by the T relays through user plane signaling includes creating the first association relation among the T relay links formed by the T relays or creating the second association relation between the air interface between the UE and the network device and each of the T relay links formed by the T relays through a UE ID and an RB ID carried in a user plane data header.

In some possible embodiments of the present disclosure, the RB ID is a Uu RB ID for downlink.

In some possible embodiments of the present disclosure, the information transmission method further includes receiving duplicated data from the network device through one of: N relays, where N is a positive integer greater than or equal to 2; or an air interface between the UE and the network device as well as M relays, where M is a positive integer greater than or equal to 1.

In some possible embodiments of the present disclosure, subsequent to receiving the duplicated data from the network device, the information transmission method further includes performing duplication detection and re-ordering on data in the duplicated data belonging to a same bearer.

In another aspect, the present disclosure provides in some embodiments an information transmission method for a network device, including receiving duplicated data from a UE through one of: N relays, where N is a positive integer greater than or equal to 2; or an air interface between the UE and the network device as well as M relays, where M is a positive integer greater than or equal to 1.

In some possible embodiments of the present disclosure, prior to receiving the duplicated data from the UE, the information transmission method further includes, after relay connection has been created between the network device and the UE, creating a first association relation among a plurality of relay links formed by the relay connection, or creating a second association relation between the air interface between the UE and the network device and each of the plurality of relay links formed by the relay connection, the first association relation is used to indicate a target bearer to transmit same data through the plurality of relay links, and the second association relation is used to indicate the target bearer to transmit same data through the air interface and the plurality of relay links.

In some possible embodiments of the present disclosure, the creating the first association relation among the plurality of relay links formed by the relay connection or creating the second association relation between the air interface between the UE and the network device and each of the plurality of relay links formed by the relay connection includes: creating the first association relation among the plurality of relay links formed by the relay connection or creating the second association relation between the air interface between the UE and the network device and each of the plurality of relay links formed by the relay connection through control plane signaling; or creating the first association relation among the plurality of relay links formed by the relay connection or creating the second association relation between the air interface between the UE and the network device and each of the plurality of relay links formed by the relay connection through user plane signaling.

In some possible embodiments of the present disclosure, the creating the first association relation among the plurality of relay links formed by the relay connection or creating the second association relation between the air interface between the UE and the network device and each of the plurality of relay links formed by the relay connection through control plane signaling includes, with respect to each relay link, recording at least one of a Uu RB ID, a Uu LCID, a relay UE ID, a UE ID, a source L2 ID, a destination L2 ID, an LCID, or an SLRB ID.

In some possible embodiments of the present disclosure, links with a same SLRB ID and a same UE ID are used by the network device as an uplink retransmission path.

In some possible embodiments of the present disclosure, the creating the first association relation among the plurality of relay links formed by the relay connection or creating the second association relation between the air interface between the UE and the network device and each of the plurality of relay links formed by the relay connection through user plane signaling includes creating the first association relation among the plurality of relay links formed by the relay connection or creating the second association relation between the air interface between the UE and the network device and each of the plurality of relay links formed by the relay connection through a UE ID and an RB ID carried in a user plane data header.

In some possible embodiments of the present disclosure, the RB ID is an SLRB ID for uplink.

In some possible embodiments of the present disclosure, subsequent to receiving the duplicated data from the UE, the information transmission method further includes performing duplication detection and re-ordering on data in the duplicated data belonging to a same bearer.

In some possible embodiments of the present disclosure, the information transmission method further includes transmitting duplicated data to the UE through one of: N relays, where N is a positive integer greater than or equal to 2; or an air interface between the UE and the network device as well as M relays, where M is a positive integer greater than or equal to 1.

In yet another aspect, the present disclosure provides in some embodiments a UE, including a transceiver, a memory, a processor, and a program stored in the memory and executed by the processor. The transceiver is configured to transmit duplicated data to a network device through one of: N relays, where N is a positive integer greater than or equal to 2; or an air interface between the UE and the network device as well as M relays, where M is a positive integer greater than or equal to 1.

In some possible embodiments of the present disclosure, the N relays are of a same relay type and belong to a same serving cell or a same serving network node.

In some possible embodiments of the present disclosure, the processor is configured to read the program in the memory, so as to: in the case that a target bearer needs to be configured or retransmission has been activated, select T relays, where T is equal to N or M; create respectively relay connection between the UE and the network device through the T relays; create a first association relation among T relay links formed by the T relays, or create a second association relation between the air interface between the UE and the network device and each of the T relay links formed by the T relays, the first association relation being used to indicate the target bearer to transmit same data through the T relay links, the second association relation being used to indicate the target bearer to transmit same data through the air interface and the T relay links; and perform duplication processing on a to-be-transmitted data packet for the target bearer to obtain the duplicated data.

In some possible embodiments of the present disclosure, the processor is further configured to: select the T relays simultaneously in one relay selection procedure; or select the T relays in multiple relay selection procedures.

In some possible embodiments of the present disclosure, the processor is further configured to: select the T relays from relays whose RSRP value is above a first RSRP threshold configured by the network device in a descending order of the RSRP values; or select the T relays in the descending order of the RSRP values of the relays.

In some possible embodiments of the present disclosure, the processor is further configured to: create the first association relation among the T relay links formed by the T relays or create the second association relation between the air interface between the UE and the network device and each of the T relay links formed by the T relays through control plane signaling; or create the first association relation among the T relay links formed by the T relays or create the second association relation between the air interface between the UE and the network device and each of the T relay links formed by the T relays through user plane signaling.

In some possible embodiments of the present disclosure, the processor is further configured to, with respect to each relay link, recording at least one of a Uu RB ID, a Uu LCID, a relay UE ID, a UE ID, a source L2 ID, a destination L2 ID, an LCID, or an SLRB ID.

In some possible embodiments of the present disclosure, links with a same Uu RB ID and a same UE ID are used by the UE as a downlink retransmission path.

In some possible embodiments of the present disclosure, the processor is further configured to create the first association relation among the T relay links formed by the T relays or create the second association relation between the air interface between the UE and the network device and each of the T relay links formed by the T relays through a UE ID and an RB ID carried in a user plane data header.

In some possible embodiments of the present disclosure, the RB ID is a Uu RB ID for downlink.

In some possible embodiments of the present disclosure, the transceiver is further configured to receive duplicated data from the network device through one of: N relays, where N is a positive integer greater than or equal to 2; or an air interface between the UE and the network device as well as M relays, where M is a positive integer greater than or equal to 1.

In some possible embodiments of the present disclosure, the processor is further configured to perform duplication detection and re-ordering on data in the duplicated data belonging to a same bearer.

In still yet another aspect, the present disclosure provides in some embodiments a UE, including a first transmission module configured to transmit duplicated data to a network device through one of: N relays, where N is a positive integer greater than or equal to 2; or an air interface between the UE and the network device as well as M relays, where M is a positive integer greater than or equal to 1.

In still yet another aspect, the present disclosure provides in some embodiments a computer-readable storage medium storing therein a computer program. The computer program is executed by a processor so as to implement the steps of the above-mentioned information transmission method.

In still yet another aspect, the present disclosure provides in some embodiments a network device, including a transceiver, a memory, a processor, and a program stored in the memory and executed by the processor. The transceiver is configured to receive duplicated data from a UE through one of: N relays, where N is a positive integer greater than or equal to 2; or an air interface between the UE and the network device as well as M relays, where M is a positive integer greater than or equal to 1.

In some possible embodiments of the present disclosure, the processor is configured to read the program in the memory, so as to, after relay connection has been created between the network device and the UE, create a first association relation among a plurality of relay links formed by the relay connection, or create a second association relation between the air interface between the UE and the network device and each of the plurality of relay links formed by the relay connection, the first association relation is used to indicate a target bearer to transmit same data through the plurality of relay links, and the second association relation is used to indicate the target bearer to transmit same data through the air interface and the plurality of relay links.

In some possible embodiments of the present disclosure, the processor is further configured to: create the first association relation among the plurality of relay links formed by the relay connection or create the second association relation between the air interface between the UE and the network device and each of the plurality of relay links formed by the relay connection through control plane signaling; or create the first association relation among the plurality of relay links formed by the relay connection or create the second association relation between the air interface between the UE and the network device and each of the plurality of relay links formed by the relay connection through user plane signaling.

In some possible embodiments of the present disclosure, the processor is further configured to, with respect to each relay link, recording at least one of a Uu RB ID, a Uu LCID, a relay UE ID, a UE ID, a source L2 ID, a destination L2 ID, an LCID, or an SLRB ID.

In some possible embodiments of the present disclosure, links with a same SLRB ID and a same UE ID are used by the network device as an uplink retransmission path.

In some possible embodiments of the present disclosure, the processor is further configured to create the first association relation among the plurality of relay links formed by the relay connection or create the second association relation between the air interface between the UE and the network device and each of the plurality of relay links formed by the relay connection through a UE ID and an RB ID carried in a user plane data header.

In some possible embodiments of the present disclosure, the RB ID is an SLRB ID for uplink.

In some possible embodiments of the present disclosure, the processor is further configured to perform duplication detection and re-ordering on data in the duplicated data belonging to a same bearer.

In some possible embodiments of the present disclosure, the transceiver is further configured to transmit duplicated data to the UE through one of: N relays, where N is a positive integer greater than or equal to 2; or an air interface between the UE and the network device as well as M relays, where M is a positive integer greater than or equal to 1.

In still yet another aspect, the present disclosure provides in some embodiments a network device, including a first reception module configured to receive duplicated data from a UE through one of: N relays, where N is a positive integer greater than or equal to 2; or an air interface between the UE and the network device as well as M relays, where M is a positive integer greater than or equal to 1.

In still yet another aspect, the present disclosure provides in some embodiments a computer-readable storage medium storing therein a computer program. The computer program is executed by a processor, so as to implement the steps of the above-mentioned information transmission method.

The present disclosure at least has the following beneficial effects.

According to the embodiments of the present disclosure, the duplicated data is transmitted to the network device through the N relays, or the air interface between the UE and the network device and the M relays, where N is an integer greater than or equal to 2, and M is an integer greater than or equal to 1. As a result, it is able to reduce a transmission delay for the UE, thereby to improve the data transmission reliability.

BRIEF DESCRIPTION OF THE DRAWINGS

FIG. 1 is a flow chart of an information transmission method according to one embodiment of the present disclosure;

FIG. 2 is another flow chart of the information transmission method according to one embodiment of the present disclosure;

FIG. 3 is yet another flow chart of the information transmission method according to one embodiment of the present disclosure;

DETAILED DESCRIPTION

Figure 4:
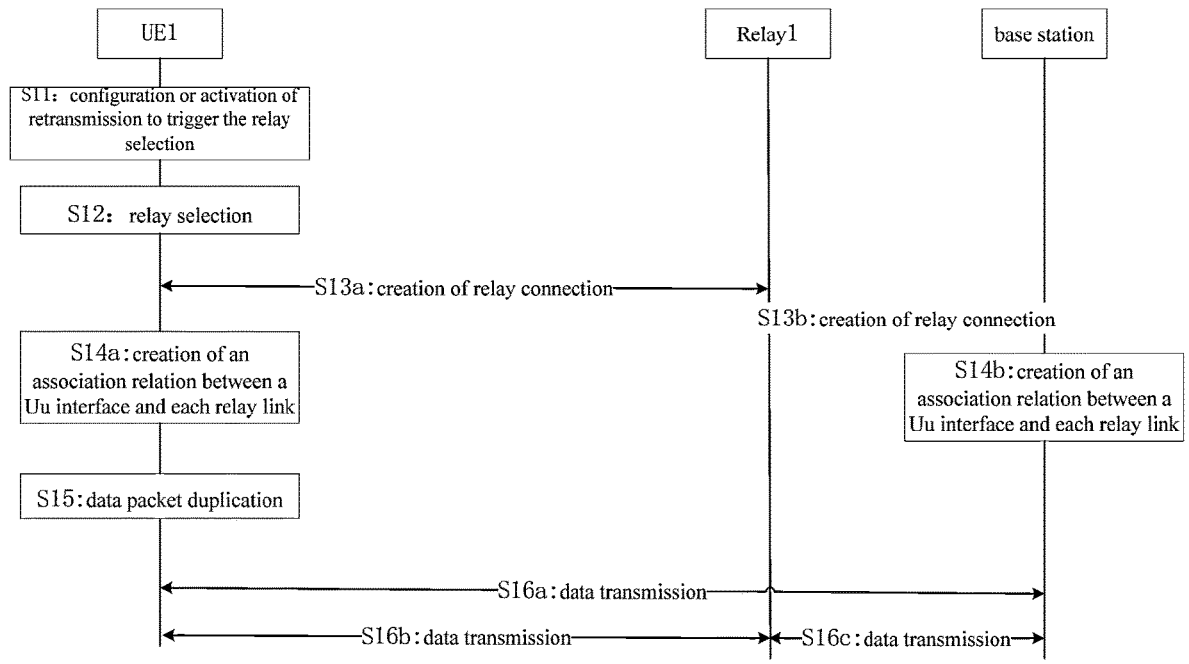
FIG. 4 is still yet another flow chart of the information transmission method according to one embodiment of the present disclosure.

In order to make the objects, the technical solutions and the advantages of the present disclosure more apparent, the present disclosure will be described hereinafter in a clear and complete manner in conjunction with the drawings and embodiments.

As shown in FIG. 1, the present disclosure provides in some embodiments an information transmission method for a UE, which includes Step 101 of transmitting duplicated data to a network device through one of: N relays, where N is a positive integer greater than or equal to 2; or an air interface between the UE and the network device as well as M relays, where M is a positive integer greater than or equal to 1.

In some possible embodiments of the present disclosure, the N relays are of a same relay type and belong to a same serving cell or a same serving network node.

Here, the air interface between the UE and the network device is a Uu interface.

It should be appreciated that, the relay in the above-mentioned step is a relay UE.

Here, the data retransmission is performed through a plurality of (at least two) relays, or through a Uu link and at least one relay, so it is able to reduce a transmission delay and improve the reliability.

According to the information transmission method in the embodiments of the present disclosure, the duplicated data is transmitted to the network device through the N relays, or the air interface between the UE and the network device and the M relays, where N is an integer greater than or equal to 2, and M is an integer greater than or equal to 1. As a result, it is able to reduce a transmission delay for the UE, thereby to improve the data transmission reliability.

Based on FIG. 1, in some possible embodiments of the present disclosure, prior to Step 101, the information transmission method further includes: in the case that a target bearer needs to be configured or retransmission has been activated, selecting T relays, where T is equal to N or M; creating respectively relay connection between the UE and the network device through the T relays; creating a first association relation among T relay links formed by the T relays, or creating a second association relation between the air interface between the UE and the network device and each of the T relay links formed by the T relays, the first association relation being used to indicate the target bearer to transmit same data through the T relay links, the second association relation being used to indicate the target bearer to transmit same data through the air interface and the T relay links; and performing duplication processing on a to-be-transmitted data packet for the target bearer to obtain the duplicated data.

The target bearer is an SLRB or an RB corresponding to the air interface (e.g., a Uu bearer).

Here, the selecting the T relays includes the following two relay selection modes.

First mode: selecting the T relays simultaneously in one relay selection procedure.

In the first mode, the selecting the T relays simultaneously in one relay selection procedure includes: selecting the T relays from relays whose RSRP value is above a first RSRP threshold configured by the network device in a descending order of the RSRP values; or selecting the T relays in the descending order of the RSRP values of the relays.

Second mode: selecting the T relays in multiple relay selection procedures.

In other words, multiple relay selection procedures are performed, and one or more relays are selected in each relay selection procedure, so as to select the T relays totally.

In some possible embodiments of the present disclosure, the creating the first association relation among the T relay links formed by the T relays or creating the second association relation between the air interface between the UE and the network device and each of the T relay links formed by the T relays includes creating the first association relation among the T relay links formed by the T relays or creating the second association relation between the air interface between the UE and the network device and each of the T relay links formed by the T relays through control plane signaling.

In some possible embodiments of the present disclosure, the creating the first association relation among the T relay links formed by the T relays or creating the second association relation between the air interface between the UE and the network device and each of the T relay links formed by the T relays through control plane signaling includes, with respect to each relay link, recording at least one of a Uu RB ID, a Uu LCID, a relay UE ID, a UE ID, a source L2 ID, a destination L2 ID, an LCID, or an SLRB ID.

Based on the above, links with a same Uu RB ID and a same UE ID are used by the UE as a downlink retransmission path.

In another possible embodiment of the present disclosure, the creating the first association relation among the T relay links formed by the T relays or creating the second association relation between the air interface between the UE and the network device and each of the T relay links formed by the T relays includes creating the first association relation among the T relay links formed by the T relays or creating the second association relation between the air interface between the UE and the network device and each of the T relay links formed by the T relays through user plane signaling.

Here, the creating the first association relation among the T relay links formed by the T relays or creating the second association relation between the air interface between the UE and the network device and each of the T relay links formed by the T relays through user plane signaling specifically includes creating the first association relation among the T relay links formed by the T relays or creating the second association relation between the air interface between the UE and the network device and each of the T relay links formed by the T relays through a UE ID and an RB ID carried in a user plane data header.

Based on the above, the RB ID is a Uu RB ID for downlink.

It should be appreciated that, not matter whether the association relation among the paths is created through the control plane signaling or the user plane signaling, its object is to enable the network device and/or the UE to determine that the data received through different paths is data belonging to a same bearer for a same UE.

Here, when the target bearer is an SLRB, the duplicated data is transmitted to the network device through the N relays upon the receipt of the duplicated data.

When the target bearer is a Uu bearer, the duplicated data is transmitted to the network device through the air interface between the UE and the network device and the M relays upon the receipt of the duplicated data.

Based on FIG. 1, in some possible embodiments of the present disclosure, the information transmission method further includes receiving duplicated data from the network device through one of: N relays, where N is a positive integer greater than or equal to 2; or an air interface between the UE and the network device as well as M relays, where M is a positive integer greater than or equal to 1.

Subsequent to receiving the duplicated data from the network device, the information transmission method further includes performing duplication detection and re-ordering on data in the duplicated data belonging to a same bearer.

It should be appreciated that, the data received through different paths and belonging to a same Uu RB ID for a same UE ID are determined in accordance with the association relation among the paths created in advance. At this time, the UE ID is an identity of the UE in the embodiments of the present disclosure.

It should be appreciated that, for the UE in the embodiments of the present disclosure, in the case that the duplicated data is transmitted to the network device through the N relays, one PDCP entity for the target bearer corresponds to a plurality of Radio Link Control (RLC) entities having different source IDs, destination IDs and LCIDs.

In the case that the duplicated data is transmitted to the network device through the air interface between the UE and the network device and the M relays, one PDCP entity for the target bearer corresponds to a plurality of RLC entities. The RLC entity corresponding to the air interface is identified with an LCID, and the RLC entity corresponding to each relay is identified with a source ID, a destination ID and an LCID. In addition, when there is a plurality of relays, the RLC entities corresponding to different relays have different source IDs, destination IDs and LCIDs.

According to the information transmission method in the embodiments of the present disclosure, the duplicated data is transmitted to the network device through the N relays, or the air interface between the UE and the network device and the M relays, where N is an integer greater than or equal to 2, and M is an integer greater than or equal to 1. As a result, it is able to reduce a transmission delay for the UE, thereby to improve the data transmission reliability.

As shown in FIG. 2, the present disclosure provides in some embodiments an information transmission method for a network device, which includes Step 201 of receiving duplicated data from a UE through one of: N relays, where N is a positive integer greater than or equal to 2; or an air interface between the UE and the network device as well as M relays, where M is a positive integer greater than or equal to 1.

It should be appreciated that, this step corresponds to the above-mentioned Step 101.

In some possible embodiments of the present disclosure, the N relays are of a same relay type and belong to a same serving cell or a same serving network node.

Here, the air interface between the UE and the network device is a Uu interface.

It should be appreciated that, the relay in the above-mentioned step is a relay UE.

According to the information transmission method in the embodiments of the present disclosure, the duplicated data is received from the UE through the N relays, or the air interface between the UE and the network device and the M relays, where N is an integer greater than or equal to 2, and M is an integer greater than or equal to 1. As a result, it is able to reduce a transmission delay for the UE, thereby to improve the data transmission reliability.

In some possible embodiments of the present disclosure, prior to Step 201, the information transmission method further includes, after relay connection has been created between the network device and the UE, creating a first association relation among a plurality of relay links formed by the relay connection, or creating a second association relation between the air interface between the UE and the network device and each of the plurality of relay links formed by the relay connection. The first association relation is used to indicate a target bearer to transmit same data through the plurality of relay links, and the second association relation is used to indicate the target bearer to transmit same data through the air interface and the plurality of relay links.

In some possible embodiments of the present disclosure, this step specifically includes creating the first association relation among the plurality of relay links formed by the relay connection or creating the second association relation between the air interface between the UE and the network device and each of the plurality of relay links formed by the relay connection through control plane signaling.

In some possible embodiments of the present disclosure, the creating the first association relation among the plurality of relay links formed by the relay connection or creating the second association relation between the air interface between the UE and the network device and each of the plurality of relay links formed by the relay connection through control plane signaling specifically includes, with respect to each relay link, recording at least one of a Uu RB ID, a Uu LCID, a relay UE ID, a UE ID, a source L2 ID, a destination L2 ID, an LCID, or an SLRB ID.

In some possible embodiments of the present disclosure, links with a same SLRB ID and a same UE ID are used by the network device as an uplink retransmission path.

In another possible embodiment of the present disclosure, this step specifically includes creating the first association relation among the plurality of relay links formed by the relay connection or creating the second association relation between the air interface between the UE and the network device and each of the plurality of relay links formed by the relay connection through user plane signaling.

Here, the creating the first association relation among the plurality of relay links formed by the relay connection or creating the second association relation between the air interface between the UE and the network device and each of the plurality of relay links formed by the relay connection through user plane signaling includes creating the first association relation among the plurality of relay links formed by the relay connection or creating the second association relation between the air interface between the UE and the network device and each of the plurality of relay links formed by the relay connection through a UE ID and an RB ID carried in a user plane data header.

Further, the RB ID is an SLRB ID for uplink.

It should be appreciated that, not matter whether the association relation among the paths is created through the control plane signaling or the user plane signaling, its object is to enable the network device and/or the UE to determine that the data received through different paths is data belonging to a same bearer for a same UE.

Based on FIG. 2, in some possible embodiments of the present disclosure, subsequent to Step 201, the information transmission method further includes performing duplication detection and re-ordering on data in the duplicated data belonging to a same bearer.

It should be appreciated that, the data received through different paths and belonging to a same Uu RB ID for a same UE ID are determined by the network device in accordance with the association relation among the paths created in advance. At this time, the UE ID is an identity of the UE in the embodiments of the present disclosure.

Based on FIG. 2, in some possible embodiments of the present disclosure, the information transmission method further includes transmitting duplicated data to the UE through one of: N relays, where N is a positive integer greater than or equal to 2; or an air interface between the UE and the network device as well as M relays, where M is a positive integer greater than or equal to 1.

According to the information transmission method in the embodiments of the present disclosure, the duplicated data is received from the UE through the N relays, or the air interface between the UE and the network device and the M relays, where N is an integer greater than or equal to 2, and M is an integer greater than or equal to 1. As a result, it is able to reduce a transmission delay for the UE, thereby to improve the data transmission reliability.

In the following two examples, the information transmission method will be described hereinafter in more details in accordance with the interaction between the UE and the network device.

First example: the retransmission is performed by the UE through a plurality of relays.

It should be appreciated that, a UE1 in this example is a UE outside a coverage range of a network.

Step S1: relay selection is performed by the UE1, as shown in FIG. 3.

It should be appreciated that, when a predetermined condition has been met, the UE1 performs the relay selection so as to access the network through the relay.

Herein, the predetermined condition is that Uu interface channel quality is lower than a predetermined threshold. In other words, in the case that the Uu interface channel quality is lower than the predetermined threshold, the relay selection is triggered.

To be specific, the UE1 selects the relay with a largest RSRP value from the relays that meet an RSRS threshold configured by the network.

Step S2: the creation of the relay connection.

Here, Step S2 includes Step S2a and Step S2b, and the connection is created between the UE1 and the network through a selected relay1.

Here, the relay1 is an L2 relay, so the UE1 is transparent to a base station.

Step S3: the configuration or activation of retransmission to trigger the relay selection.

With respect to an SLRB, the UE determines whether it is necessary to configure/activate the retransmission. When the retransmission needs to be configured/activated, the relay selection is triggered. The quantity of selected relays is equal to the quantity of RLC entities corresponding to the SLRB.

Step S4: the creation of the relay connection.

Here, Step S4 includes Step S4a and Step S4b. The relay connection is created by the UE1 through a relay2 selected in Step S3.

Step 5: the creation of an association relation among a plurality of relay links.

Here, Step 5 includes Step S5a and Step S5b.

The association relation is created through control plane signaling or user plane signaling.

1) The association relation among the plurality of paths is created through control plane signaling.

For downlink, when a bearer is created through the relay and the network, with respect to each relay link, the UE1 records a Uu RB ID of the bearer, a Uu LCID corresponding to the relay link, a relay UE ID, a UE ID, a source L2 ID/a destination L2 ID/an LCID, and an SLRB ID. Next, the relay links having a same UE ID and a same Uu RB ID are associated with each other by the UE1.

The above process corresponds to Step S5a.

Here, the association is performed so as to indicate the SLRB to transmit the same data through the plurality of relay links.

For uplink, when a bearer is created through the relay and the network, with respect to each relay link, the network device records a Uu RB ID of the bearer, a Uu LCID corresponding to the relay link, a relay UE ID, a UE ID, a source L2 ID/a destination L2 ID/an LCID, and an SLRB ID. Next, the relay links having a same UE ID and a same SLRB ID are associated with each other by the network device.

The above procedure corresponds to Step S5b.

2) The association relation among the plurality of paths is created through user control plane signaling.

For downlink, a UE ID and a Uu RB ID are carried in a user plane data header. And for uplink, a UE ID and an SLRB ID are carried in the user plane data header.

Step S6: data packet duplication.

The data packet duplication is performed with respect to the bearer for the configured/activated retransmission, e.g., at a PDCP layer. A duplicated data packet is transmitted to different RLC entities for bearing the duplicated data and corresponding to the PDCP entity.

When the retransmission is performed through a plurality of relays, one PDCP entity for the bearer corresponds to a plurality of RLC entities having different source IDs, destination IDs and LCIDs.

When the retransmission is performed through the Uu interface and at least one relay, one PDCP entity for the bearer corresponds to a plurality of RLC entities. The RLC entity corresponding to the Uu interface is identified with an LCID, and the RLC entity corresponding to each relay is identified with a source ID, a destination ID and an LCID. When there are multiple relays, the RLC entities corresponding to different relays have different source IDs, destination IDs and LCIDs.

Step S7: the transmission of duplicated data.

Step S7 includes Steps S7a, S7b, S7c and S7d, and in this step, the duplicated data is transmitted through the relay. Here, the transmission of the duplicated data includes uplink transmission of the duplicated data and downlink transmission of the duplicated data.

For the uplink, the UE1 transmits the duplicated data to the network side device (e.g., the base station) through different paths, and then the network device needs to perform duplication detection and re-ordering on the data received through the paths and belonging to a same bearer for a same UE.

For the downlink, the network device transmits the duplicated data to the UE1 through different paths, and then the UE1 needs to perform duplication detection and re-ordering on the data received through the paths and belonging to a same bearer for a same UE.

Second example: the retransmission is performed by the UE through the Uu interface and at least one relay.

It should be appreciated that, a UE1 in this example is a UE outside a coverage range of a network.

Step 11: the configuration or activation of retransmission to trigger relay selection, as shown in FIG. 4.

Here, the UE creates a Uu bearer, and then determines, with respect to the Uu bearer, whether it is necessary to configure/activate the retransmission. When the retransmission needs to be configured/activated, the relay selection is triggered.

The quantity of selected relays is equal to the quantity of RLC entities corresponding to the Uu bearer minus one.

Step S12: the relay selection is performed by the UE1.

To be specific, the UE1 selects a plurality of relays from relays whose RSPR value meets an RSRP threshold configured by the network in a descending order of the RSRP values.

Step S13: the creation of the relay connection.

Here, Step S13 includes Step S13a and Step S13b, and the connection is created between the UE1 and the network (i.e., a base station) through a selected relay1.

Here, the relay1 is an L2 relay, so the UE1 is transparent to a base station.

Step S14: the creation of an association relation between the Uu interface and each of the plurality of relay links.

To be specific, in this example, the association relation between a Uu interface link between the UE1 and the base station and a relay link formed by the relay1 is created.

Here, Step S14 includes Step S14a and Step S14b.

The association relation is created through control plane signaling or user plane signaling.

1) The association relation among the plurality of paths is created through control plane signaling.

For downlink, the UE1 records a Uu RB ID of a bearer, a Uu LCID corresponding to the relay link, a relay UE ID, a UE ID, a source L2 ID/a destination L2 ID/an LCID, and an SLRB ID. Next, the paths having a same UE ID and a same Uu RB ID are associated with each other by the UE1.

The above-mentioned procedure corresponds to Step S14a.

Here, the association is performed so as to indicate the Uu bearer to transmit the same data through the plurality of paths (i.e., the Uu interface link between the UE1 and the base station and the relay link formed by the relay1).

For uplink, the network device records a Uu RB ID of the bearer, a Uu LCID corresponding to the relay link, a relay UE ID, a UE ID, a source L2 ID/a destination L2 ID/an LCID, and an SLRB ID. Next, the relay links having a same UE ID and a same SLRB ID are associated with each other by the network device.

The above-mentioned procedure corresponds to Step S14b.

2) The association relation among the plurality of paths is created through user control plane signaling.

For downlink, a UE ID and a Uu RB ID are carried in a user plane data header. And for uplink, a UE ID and an SLRB ID are carried in the user plane data header.

Step S15: data packet duplication.

The data packet duplication is performed with respect to the bearer for the configured/activated retransmission, e.g., at a PDCP layer. A duplicated data packet is transmitted to different RLC entities for bearing the duplicated data and corresponding to the PDCP entity.

When the retransmission is performed through a plurality of relays, one PDCP entity for the bearer corresponds to a plurality of RLC entities having different source IDs, destination IDs and LCIDs.

When the retransmission is performed through the Uu interface and at least one relay, one PDCP entity for the bearer corresponds to a plurality of RLC entities. The RLC entity corresponding to the Uu interface is identified with an LCID, and the RLC entity corresponding to each relay is identified with a source ID, a destination ID and an LCID. When there are multiple relays, the RLC entities corresponding to different relays have different source IDs, destination IDs and LCIDs.

Step S16: the transmission of duplicated data.

Step S16 includes Steps S16a, S16b and S16c, and in this step, the duplicated data is transmitted through the relay. Here, the transmission of the duplicated data includes uplink transmission of the duplicated data and downlink transmission of the duplicated data.

For the uplink, the UE1 transmits the duplicated data to the network side device (e.g., the base station) through different paths, and then the network device needs to perform duplication detection and re-ordering on the data received through the paths and belonging to a same bearer for a same UE.

For the downlink, the network device transmits the duplicated data to the UE1 through different paths, and then the UE1 needs to perform duplication detection and re-ordering on the data received through the paths and belonging to a same bearer for a same UE.

Figure 5:
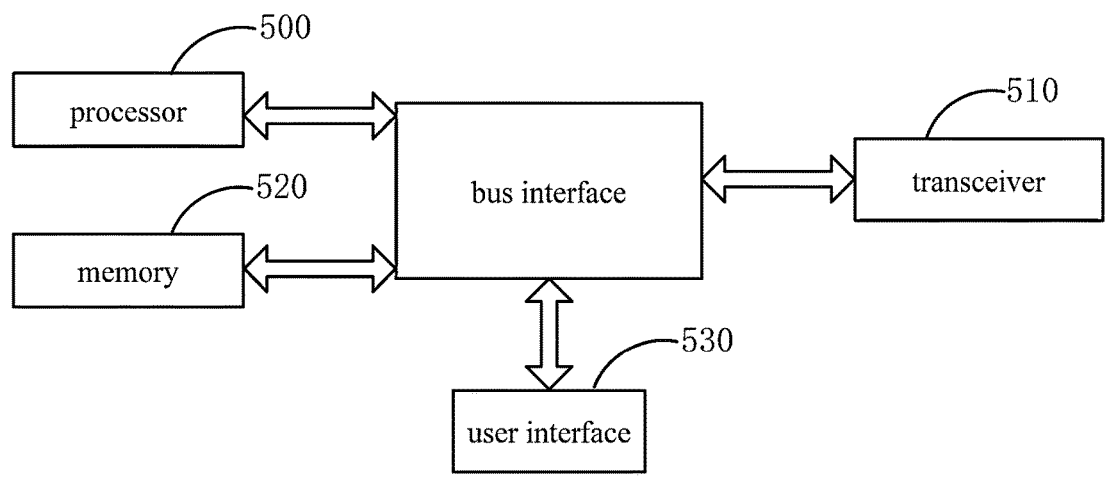
FIG. 5 is a block diagram of a UE according to one embodiment of the present disclosure.

As shown in FIG. 5, the present disclosure further provides in some embodiments a UE, which includes a memory 520, a processor 500, a transceiver 510, a bus interface, and a program stored in the memory 520 and executed by the processor 500. The transceiver 510 is configured to transmit duplicated data to a network device through one of: N relays, where N is a positive integer greater than or equal to 2; or an air interface between the UE and the network device as well as M relays, where M is a positive integer greater than or equal to 1.

In FIG. 5, bus architecture may include a number of buses and bridges connected to each other, so as to connect various circuits for one or more processors 500 and one or more memories 520. In addition, as is known in the art, the bus architecture may be used to connect any other circuits, such as a circuit for a peripheral device, a circuit for a voltage stabilizer and a power management circuit. The bus interface may be provided, and the transceiver 510 may consist of a plurality of elements, i.e., a transmitter and a receiver for communication with any other devices over a transmission medium. With respect to different UEs, a user interface 530 may also be provided for devices which are to be arranged inside or outside the UE, and these devices may include but not limited to a keypad, a display, a speaker, a microphone and a joystick.

The processor 500 may take charge of managing the bus architecture as well as general processing. The memory 520 may store therein data for the operation of the processor 500.

In some possible embodiments of the present disclosure, the N relays are of a same relay type and belong to a same serving cell or a same serving network node.

In some possible embodiments of the present disclosure, the processor 500 is configured to read the program in the memory 520, so as to: in the case that a target bearer needs to be configured or retransmission has been activated, select T relays, where T is equal to N or M; create respectively relay connection between the UE and the network device through the T relays; create a first association relation among T relay links formed by the T relays, or create a second association relation between the air interface between the UE and the network device and each of the T relay links formed by the T relays, the first association relation being used to indicate the target bearer to transmit same data through the T relay links, the second association relation being used to indicate the target bearer to transmit same data through the air interface and the T relay links; and perform duplication processing on a to-be-transmitted data packet for the target bearer to obtain the duplicated data.

In some possible embodiments of the present disclosure, the processor 500 is further configured to: select the T relays simultaneously in one relay selection procedure; or select the T relays in multiple relay selection procedures.

In some possible embodiments of the present disclosure, the processor 500 is further configured to: select the T relays from relays whose RSRP value is above a first RSRP threshold configured by the network device in a descending order of the RSRP values; or select the T relays in the descending order of the RSRP values of the relays.

In some possible embodiments of the present disclosure, the processor 500 is further configured to: create the first association relation among the T relay links formed by the T relays or create the second association relation between the air interface between the UE and the network device and each of the T relay links formed by the T relays through control plane signaling; or create the first association relation among the T relay links formed by the T relays or create the second association relation between the air interface between the UE and the network device and each of the T relay links formed by the T relays through user plane signaling.

In some possible embodiments of the present disclosure, the processor 500 is further configured to, with respect to each relay link, recording at least one of a Uu RB ID, a Uu LCID, a relay UE ID, a UE ID, a source L2 ID, a destination L2 ID, an LCID, or an SLRB ID.

In some possible embodiments of the present disclosure, links with a same Uu RB ID and a same UE ID are used by the UE as a downlink retransmission path.

In some possible embodiments of the present disclosure, the processor 500 is further configured to create the first association relation among the T relay links formed by the T relays or create the second association relation between the air interface between the UE and the network device and each of the T relay links formed by the T relays through a UE ID and an RB ID carried in a user plane data header.

In some possible embodiments of the present disclosure, the RB ID is a Uu RB ID for downlink.

In some possible embodiments of the present disclosure, the transceiver 510 is further configured to receive duplicated data from the network device through one of: N relays, where N is a positive integer greater than or equal to 2; or an air interface between the UE and the network device as well as M relays, where M is a positive integer greater than or equal to 1.

In some possible embodiments of the present disclosure, the processor 500 is further configured to perform duplication detection and re-ordering on data in the duplicated data belonging to a same bearer.

The present disclosure further provides in some embodiments a UE. A principle of the UE for solving the problem is similar to that of the above-mentioned information transmission method, so the implementation of the UE may refer to that of the information transmission method, which will thus not be particularly defined herein.

According to the UE in the embodiments of the present disclosure, the duplicated data is transmitted to the network device through the N relays, or the air interface between the UE and the network device and the M relays, where N is an integer greater than or equal to 2, and M is an integer greater than or equal to 1. As a result, it is able to reduce a transmission delay for the UE, thereby to improve the data transmission reliability.

It should be appreciated that, the UE in the embodiments of the present disclosure is capable of implementing the above-mentioned information transmission method, so the implementation of the UE may refer to that of the information transmission method with a same or similar beneficial effect.

Figure 6:
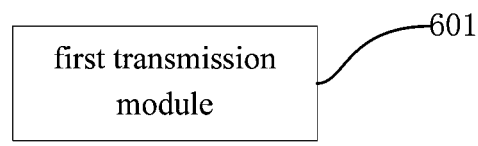
FIG. 6 is a schematic view showing the UE according to one embodiment of the present disclosure.

As shown in FIG. 6, the present disclosure further provides in some embodiments a UE, which includes a first transmission module 601 configured to transmit duplicated data to a network device through one of: N relays, where N is a positive integer greater than or equal to 2; or an air interface between the UE and the network device as well as M relays, where M is a positive integer greater than or equal to 1.

In some possible embodiments of the present disclosure, the N relays are of a same relay type and belong to a same serving cell or a same serving network node.

In some possible embodiments of the present disclosure, the UE further includes: a selection module configured to, in the case that a target bearer needs to be configured or retransmission has been activated, select T relays, where T is equal to N or M; a relay connection creation module configured to create respectively relay connection between the UE and the network device through the T relays; a first association relation creation module configured to create a first association relation among T relay links formed by the T relays, or create a second association relation between the air interface between the UE and the network device and each of the T relay links formed by the T relays, the first association relation being used to indicate the target bearer to transmit same data through the T relay links, the second association relation being used to indicate the target bearer to transmit same data through the air interface and the T relay links; and a duplication processing module configured to perform duplication processing on a to-be-transmitted data packet for the target bearer to obtain the duplicated data.

In some possible embodiments of the present disclosure, the selection module includes: a first selection unit configured to select the T relays simultaneously in one relay selection procedure; or a second selection unit configured to select the T relays in multiple relay selection procedures.

In some possible embodiments of the present disclosure, the first selection unit is specifically configured to: select the T relays from relays whose RSRP value is above a first RSRP threshold configured by the network device in a descending order of the RSRP values; or select the T relays in the descending order of the RSRP values of the relays.

In some possible embodiments of the present disclosure, the first association relation creation module includes: a first association creation unit configured to create the first association relation among the T relay links formed by the T relays or create the second association relation between the air interface between the UE and the network device and each of the T relay links formed by the T relays through control plane signaling; or a second relation creation unit configured to create the first association relation among the T relay links formed by the T relays or create the second association relation between the air interface between the UE and the network device and each of the T relay links formed by the T relays through user plane signaling.

In some possible embodiments of the present disclosure, the first relation creation unit is specifically configured to, with respect to each relay link, record at least one of a Uu RB ID, a Uu LCID, a relay UE ID, a UE ID, a source L2 ID, a destination L2 ID, an LCID, or an SLRB ID.

In some possible embodiments of the present disclosure, links with a same Uu RB ID and a same UE ID are used by the UE as a downlink retransmission path.

In some possible embodiments of the present disclosure, the second relation creation unit is specifically configured to create the first association relation among the T relay links formed by the T relays or create the second association relation between the air interface between the UE and the network device and each of the T relay links formed by the T relays through a UE ID and an RB ID carried in a user plane data header.

In some possible embodiments of the present disclosure, the RB ID is a Uu RB ID for downlink.

In some possible embodiments of the present disclosure, the UE further includes a second reception module configured to receive duplicated data from the network device through one of: N relays, where N is a positive integer greater than or equal to 2; or an air interface between the UE and the network device as well as M relays, where M is a positive integer greater than or equal to 1.

In some possible embodiments of the present disclosure, the UE further includes a first processing module configured to perform duplication detection and re-ordering on data in the duplicated data belonging to a same bearer.

The present disclosure further provides in some embodiments a UE. A principle of the UE for solving the problem is similar to that of the above-mentioned information transmission method, so the implementation of the UE may refer to that of the information transmission method, which will thus not be particularly defined herein.

According to the UE in the embodiments of the present disclosure, the duplicated data is transmitted to the network device through the N relays, or the air interface between the UE and the network device and the M relays, where N is an integer greater than or equal to 2, and M is an integer greater than or equal to 1. As a result, it is able to reduce a transmission delay for the UE, thereby to improve the data transmission reliability.

It should be appreciated that, the UE in the embodiments of the present disclosure is capable of implementing the above-mentioned information transmission method, so the implementation of the UE may refer to that of the information transmission method with a same or similar beneficial effect.

The present disclosure further provides in some embodiments a computer-readable storage medium storing therein a computer program. The computer program is executed by a processor, so as to transmit duplicated data to a network device through one of: N relays, where N is a positive integer greater than or equal to 2; or an air interface between the UE and the network device as well as M relays, where M is a positive integer greater than or equal to 1.

The computer program is executed by the processor so as to implement the above-mentioned information transmission method for the UE in FIG. 1, which will thus not be particularly defined herein.

Figure 7:
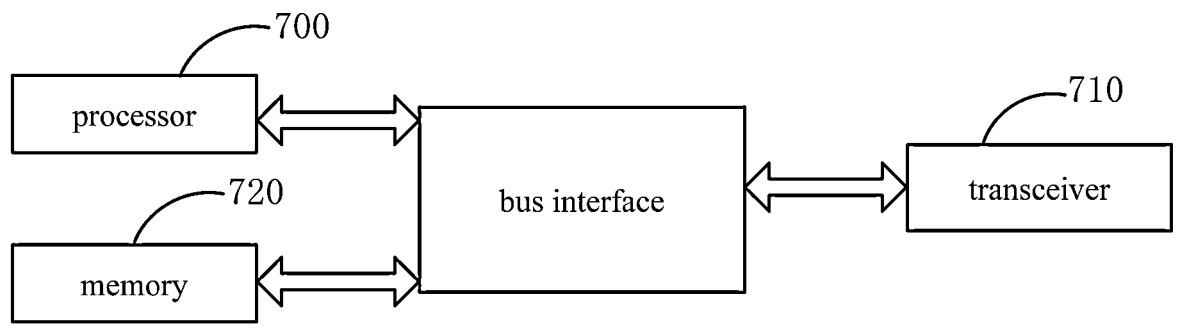
FIG. 7 is a block diagram of a network device according to one embodiment of the present disclosure.

As shown in FIG. 7, the present disclosure further provides in some embodiments a network device, which includes a transceiver 710, a memory 720, a processor 700, and a program stored in the memory and executed by the processor. The transceiver 710 is configured to receive duplicated data from a UE through one of: N relays, where N is a positive integer greater than or equal to 2; or an air interface between the UE and the network device as well as M relays, where M is a positive integer greater than or equal to 1.

In FIG. 7, bus architecture may include a number of buses and bridges connected to each other, so as to connect various circuits for one or more processors 700 and one or more memories 720. In addition, as is known in the art, the bus architecture may be used to connect any other circuits, such as a circuit for a peripheral device, a circuit for a voltage stabilizer and a power management circuit. A bus interface may be provided, and the transceiver 710 may consist of a plurality of elements, i.e., a transmitter and a receiver for communication with any other devices over a transmission medium. The processor 700 may take charge of managing the bus architecture as well as general processing. The memory 720 may store therein data for the operation of the processor 700.

In some possible embodiments of the present disclosure, the processor 700 is configured to read the program in the memory 720, so as to, after relay connection has been created between the network device and the UE, create a first association relation among a plurality of relay links formed by the relay connection, or create a second association relation between the air interface between the UE and the network device and each of the plurality of relay links formed by the relay connection, the first association relation is used to indicate a target bearer to transmit same data through the plurality of relay links, and the second association relation is used to indicate the target bearer to transmit same data through the air interface and the plurality of relay links.

In some possible embodiments of the present disclosure, the processor 700 is further configured to: create the first association relation among the plurality of relay links formed by the relay connection or create the second association relation between the air interface between the UE and the network device and each of the plurality of relay links formed by the relay connection through control plane signaling; or create the first association relation among the plurality of relay links formed by the relay connection or create the second association relation between the air interface between the UE and the network device and each of the plurality of relay links formed by the relay connection through user plane signaling.

In some possible embodiments of the present disclosure, the processor 700 is further configured to, with respect to each relay link, recording at least one of a Uu RB ID, a Uu LCID, a relay UE ID, a UE ID, a source L2 ID, a destination L2 ID, an LCID, or an SLRB ID.

In some possible embodiments of the present disclosure, links with a same SLRB ID and a same UE ID are used by the network device as an uplink retransmission path.

In some possible embodiments of the present disclosure, the processor 700 is further configured to create the first association relation among the plurality of relay links formed by the relay connection or create the second association relation between the air interface between the UE and the network device and each of the plurality of relay links formed by the relay connection through a UE ID and an RB ID carried in a user plane data header.

In some possible embodiments of the present disclosure, the RB ID is an SLRB ID for uplink.

In some possible embodiments of the present disclosure, the processor 700 is further configured to perform duplication detection and re-ordering on data in the duplicated data belonging to a same bearer.

In some possible embodiments of the present disclosure, the transceiver 710 is further configured to transmit duplicated data to the UE through one of: N relays, where N is a positive integer greater than or equal to 2; or an air interface between the UE and the network device as well as M relays, where M is a positive integer greater than or equal to 1.

The present disclosure further provides in some embodiments a network device. A principle of the network device for solving the problem is similar to that of the above-mentioned information transmission method, so the implementation of the network device may refer to that of the information transmission method, which will thus not be particularly defined herein.

According to the network device in the embodiments of the present disclosure, the duplicated data is received from the UE through the N relays, or the air interface between the UE and the network device and the M relays, where N is an integer greater than or equal to 2, and M is an integer greater than or equal to 1. As a result, it is able to reduce a transmission delay for the UE, thereby to improve the data transmission reliability.

It should be appreciated that, the network device in the embodiments of the present disclosure is capable of implementing the above-mentioned information transmission method, so the implementation of the network device may refer to that of the information transmission method with a same or similar beneficial effect.

Figure 8:
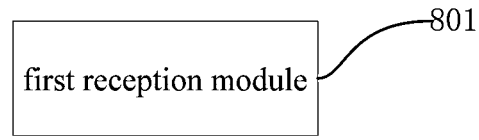
FIG. 8 is a schematic view showing the network device according to one embodiment of the present disclosure.

As shown in FIG. 8, the present disclosure further provides in some embodiments a network device, which includes a first reception module 801 configured to receive duplicated data from a UE through one of: N relays, where N is a positive integer greater than or equal to 2; or an air interface between the UE and the network device as well as M relays, where M is a positive integer greater than or equal to 1.

In some possible embodiments of the present disclosure, the network device further includes a second association relation creation module configured to, after relay connection has been created between the network device and the UE, create a first association relation among a plurality of relay links formed by the relay connection, or create a second association relation between the air interface between the UE and the network device and each of the plurality of relay links formed by the relay connection, the first association relation is used to indicate a target bearer to transmit same data through the plurality of relay links, and the second association relation is used to indicate the target bearer to transmit same data through the air interface and the plurality of relay links.

In some possible embodiments of the present disclosure, the second association relation creation module includes: a third relation creation unit configured to create the first association relation among the plurality of relay links formed by the relay connection or create the second association relation between the air interface between the UE and the network device and each of the plurality of relay links formed by the relay connection through control plane signaling; or a fourth relation creation unit configured to create the first association relation among the plurality of relay links formed by the relay connection or create the second association relation between the air interface between the UE and the network device and each of the plurality of relay links formed by the relay connection through user plane signaling.

In some possible embodiments of the present disclosure, the third relation creation unit is specifically configured to, with respect to each relay link, record at least one of a Uu RB ID, a Uu LCID, a relay UE ID, a UE ID, a source L2 ID, a destination L2 ID, an LCID, or an SLRB ID.

In some possible embodiments of the present disclosure, links with a same SLRB ID and a same UE ID are used by the network device as an uplink retransmission path.

In some possible embodiments of the present disclosure, the fourth relation creation unit is specifically configured to create the first association relation among the plurality of relay links formed by the relay connection or creating the second association relation between the air interface between the UE and the network device and each of the plurality of relay links formed by the relay connection through a UE ID and an RB ID carried in a user plane data header.

In some possible embodiments of the present disclosure, the RB ID is an SLRB ID for uplink.

In some possible embodiments of the present disclosure, the network device further includes a second processing module configured to perform duplication detection and re-ordering on data in the duplicated data belonging to a same bearer.

In some possible embodiments of the present disclosure, the network device further includes a second transmission module configured to transmit duplicated data to the UE through one of: N relays, where N is a positive integer greater than or equal to 2; or an air interface between the UE and the network device as well as M relays, where M is a positive integer greater than or equal to 1.

The present disclosure further provides in some embodiments a network device. A principle of the network device for solving the problem is similar to that of the above-mentioned information transmission method, so the implementation of the network device may refer to that of the information transmission method, which will thus not be particularly defined herein.

According to the network device in the embodiments of the present disclosure, the duplicated data is received from the UE through the N relays, or the air interface between the UE and the network device and the M relays, where N is an integer greater than or equal to 2, and M is an integer greater than or equal to 1. As a result, it is able to reduce a transmission delay for the UE, thereby to improve the data transmission reliability.

It should be appreciated that, the network device in the embodiments of the present disclosure is capable of implementing the above-mentioned information transmission method, so the implementation of the network device may refer to that of the information transmission method with a same or similar beneficial effect.

The present disclosure further provides in some embodiments a computer-readable storage medium storing therein a computer program. The computer program is executed by a processor so as to implement the above-mentioned information transmission method.

The computer program is executed by the processor so as to implement the above-mentioned information transmission method for the network device in FIG. 2, which will thus not be particularly defined herein.

It should be further appreciated that, serial numbers of the steps shall not be used to define the order of the steps, and instead, the order of the steps shall be determined in accordance with their functions and internal logics.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information transmission method performed by a User Equipment (UE), the information transmission method comprising:
    transmitting duplicated data to a network device through one of: N relays, where N is a positive integer greater than or equal to 2; or an air interface between the UE and the network device as well as M relays, where M is a positive integer greater than or equal to 1,
    wherein the UE is directly connected with a plurality of relays within the N relays simultaneously, the UE is connected with the network device through different paths established via the plurality of relays within the N relays, and the UE is configured to send its own data to the network device through one or more paths within the different paths.

2. The information transmission method according to claim 1, wherein the N relays are of a same relay type and belong to a same serving cell or a same serving network node.

3. The information transmission method according to claim 1, wherein prior to transmitting the duplicated data to the network device, the information transmission method further comprises:
    in the case that a target bearer needs to be configured or retransmission has been activated, selecting T relays, where T is equal to N or M;
    creating respectively relay connection between the UE and the network device through the T relays;
    creating a first association relation among T relay links formed by the T relays, or creating a second association relation between (i) the air interface between the UE and the network device and (ii) each of the T relay links formed by the T relays, the first association relation being used to indicate the target bearer to transmit same data through the T relay links, the second association relation being used to indicate the target bearer to transmit same data through the air interface and the T relay links; and
    performing duplication processing on a to-be-transmitted data packet for the target bearer to obtain the duplicated data.

4. The information transmission method according to claim 3, wherein the selecting the T relays comprises: selecting the T relays simultaneously in one relay selection procedure; or selecting the T relays in multiple relay selection procedures.

5. The information transmission method according to claim 4, wherein the selecting the T relays simultaneously in one relay selection procedure comprises:
    selecting the T relays from relays whose Reference Signal Received Power (RSRP) value is above a first RSRP threshold configured by the network device in a descending order of the RSRP values; or
    selecting the T relays in the descending order of the RSRP values of the relays.

6. The information transmission method according to claim 3, wherein the creating the first association relation among the T relay links formed by the T relays or creating the second association relation between (i) the air interface between the UE and the network device and (ii) each of the T relay links formed by the T relays comprises:
    creating the first association relation among the T relay links formed by the T relays or creating the second association relation between (i) the air interface between the UE and the network device and (ii) each of the T relay links formed by the T relays through control plane signaling; or
    creating the first association relation among the T relay links formed by the T relays or creating the second association relation between (i) the air interface between the UE and the network device and (ii) each of the T relay links formed by the T relays through user plane signaling.

7. The information transmission method according to claim 6, wherein the creating the first association relation among the T relay links formed by the T relays or creating the second association relation between (i) the air interface between the UE and the network device and (ii) each of the T relay links formed by the T relays through control plane signaling comprises:
    with respect to each relay link, recording at least one of an air interface (Uu) Radio Bearer (RB) Identity (ID), a Uu Logic Channel Identity (LCID), a relay UE ID, a UE ID, a source L2 ID, a destination L2 ID, an LCID, or a Sidelink Radio Bearer (SLRB) ID.

8. The information transmission method according to claim 7, wherein links with a same Uu RB ID and a same UE ID are used by the UE as a downlink retransmission path.

9. The information transmission method according to claim 6, wherein the creating the first association relation among the T relay links formed by the T relays or creating the second association relation between (i) the air interface between the UE and the network device and (ii) each of the T relay links formed by the T relays through user plane signaling comprises:
    creating the first association relation among the T relay links formed by the T relays or creating the second association relation between (i) the air interface between the UE and the network device and (ii) each of the T relay links formed by the T relays through a UE ID and an RB ID carried in a user plane data header.

10. The information transmission method according to claim 9, wherein the RB ID is a Uu RB ID for downlink.

11. The information transmission method according to claim 1, further comprising:
    receiving duplicated data from the network device through one of: N relays, where N is a positive integer greater than or equal to 2; or an air interface between the UE and the network device as well as M relays, where M is a positive integer greater than or equal to 1.

12. The information transmission method according to claim 11, wherein subsequent to receiving the duplicated data from the network device, the information transmission method further comprises:
    performing duplication detection and re-ordering on data in the duplicated data belonging to a same bearer.

13. An information transmission method performed by a network device, the information transmission method comprising:
    receiving duplicated data from a User Equipment (UE) through one of: N relays, where N is a positive integer greater than or equal to 2; or an air interface between the UE and the network device as well as M relays, where M is a positive integer greater than or equal to 1, wherein the UE is directly connected with a plurality of relays within the N relays simultaneously, the UE is connected with the network device through different paths established via the plurality of relays within the N relays, and the UE is configured to send its own data to the network device through one or more paths within the different paths.

14. The information transmission method according to claim 13, wherein prior to receiving the duplicated data from the UE, the information transmission method further comprises:
after relay connection has been created between the network device and the UE, creating a first association relation among a plurality of relay links formed by the relay connection, or creating a second association relation between (i) the air interface between the UE and the network device and (ii) each of the plurality of relay links formed by the relay connection, wherein the first association relation is used to indicate a target bearer to transmit same data through the plurality of relay links, and the second association relation is used to indicate the target bearer to transmit same data through the air interface and the plurality of relay links.

15. The information transmission method according to claim 14, wherein the creating the first association relation among the plurality of relay links formed by the relay connection or creating the second association relation between the air interface between the UE and the network device and each of the plurality of relay links formed by the relay connection comprises:
creating the first association relation among the plurality of relay links formed by the relay connection or creating the second association relation between (i) the air interface between the UE and the network device and (ii) each of the plurality of relay links formed by the relay connection through control plane signaling; or
creating the first association relation among the plurality of relay links formed by the relay connection or creating the second association relation between (i) the air interface between the UE and the network device and (ii) each of the plurality of relay links formed by the relay connection through user plane signaling.

16. A network device, comprising a transceiver, a memory, a processor, and a program stored in the memory and executed by the processor, when the program is called and executed by the processor of the network device, the information transmission method according to claim 13 is realized.

17. The network device according to claim 16, wherein the processor is configured to read the program in the memory, so as to, after relay connection has been created between the network device and the UE, create a first association relation among a plurality of relay links formed by the relay connection, or create a second association relation between (i) the air interface between the UE and the network device and (ii) each of the plurality of relay links formed by the relay connection, the first association relation is used to indicate a target bearer to transmit same data through the plurality of relay links, and the second association relation is used to indicate the target bearer to transmit same data through the air interface and the plurality of relay links.

18. The network device according to claim 16, wherein the processor is further configured to perform duplication detection and re-ordering on data in the duplicated data belonging to a same bearer.

19. A User Equipment (UE), comprising a transceiver, a memory, a processor, and a program stored in the memory and executed by the processor, wherein the transceiver is configured to transmit duplicated data to a network device through one of: N relays, where N is a positive integer greater than or equal to 2; or an air interface between the UE and the network device as well as M relays, where M is a positive integer greater than or equal to 1,
wherein the UE is directly connected with a plurality of relays within the N relays simultaneously, the UE is connected with the network device through different paths established via the plurality of relays within the N relays, and the UE is configured to send its own data to the network device through one or more paths within the different paths.

20. The UE according to claim 19, wherein the processor is configured to read the program in the memory, so as to: in the case that a target bearer needs to be configured or retransmission has been activated, select T relays, where T is equal to N or M; create respectively relay connection between the UE and the network device through the T relays; create a first association relation among T relay links formed by the T relays, or create a second association relation between (i) the air interface between the UE and the network device and (ii) each of the T relay links formed by the T relays, the first association relation being used to indicate the target bearer to transmit same data through the T relay links, the second association relation being used to indicate the target bearer to transmit same data through the air interface and the T relay links; and perform duplication processing on a to-be-transmitted data packet for the target bearer to obtain the duplicated data.

* * * * *